United States Patent
Abe et al.

(10) Patent No.: US 10,676,366 B2
(45) Date of Patent: Jun. 9, 2020

(54) HYDROGENATED SILANE COMPOSITION

(71) Applicant: NIPPON SHOKUBAI CO., LTD., Osaka (JP)

(72) Inventors: Takashi Abe, Osaka (JP); Chiho Mizushima, Osaka (JP); Tatsuhiko Akiyama, Osaka (JP); Takuya Kamiyama, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 16/110,362

(22) Filed: Aug. 23, 2018

(65) Prior Publication Data
US 2019/0135642 A1 May 9, 2019

(30) Foreign Application Priority Data

Aug. 28, 2017 (JP) ................. 2017-163764

(51) Int. Cl.
*C01B 33/04* (2006.01)
(52) U.S. Cl.
CPC .......... *C01B 33/04* (2013.01); *C01P 2006/80* (2013.01)
(58) Field of Classification Search
CPC .............................. C01B 33/04; C01P 2006/80
See application file for complete search history.

(56) References Cited

U.S. PATENT DOCUMENTS

| | | | |
|---|---|---|---|
| 4,554,180 A | 11/1985 | Hirooka | |
| 2012/0003819 A1 | 1/2012 | Francis et al. | |
| 2012/0024223 A1 | 2/2012 | Torres, Jr. et al. | |
| 2014/0219893 A1* | 8/2014 | Imoto | C01B 33/04 423/210 |
| 2016/0311692 A1 | 10/2016 | Kitamura et al. | |

FOREIGN PATENT DOCUMENTS

| | | |
|---|---|---|
| JP | 60-26664 | 2/1985 |
| JP | 2013-187261 | 9/2013 |
| JP | 2013-537705 | 10/2013 |
| JP | 2015-134755 | 7/2015 |

* cited by examiner

*Primary Examiner* — Amber R Orlando
*Assistant Examiner* — Syed T Iqbal
(74) *Attorney, Agent, or Firm* — Wenderoth, Lind & Ponack, L.L.P.

(57) ABSTRACT

At least one embodiment of the present disclosure provides a hydrogenated silane composition containing a cyclic hydrogenated silane having high storage stability.

The at least one embodiment of the present disclosure relates to a hydrogenated silane composition, wherein a content ratio of a linear hydrogenated silane having Si atoms of 5 or less to a cyclic hydrogenated silane having Si atoms of 5 to 7 is 0.009 or less, wherein the cyclic hydrogenated silane comprises at least cyclohexasilane, and further comprises at least one cyclic hydrogenated silane having a branched silyl group selected from silylcyclopentasilane and silylcyclohexasilane, and wherein a content ratio of a total of the silylcyclopentasilane and the silylcyclohexasilane to the cyclic hydrogenated silane having Si atoms of 5 to 7 is 10 ppb or more on a mass basis.

16 Claims, No Drawings

HYDROGENATED SILANE COMPOSITION

BACKGROUND OF THE INVENTION

Field of the Invention

This application claims the benefit of priority based on Japanese Patent Application No. 2017-163764, filed on Aug. 28, 2017. The entire content of the specification of Japanese Patent Application No. 2017-163764, filed on Aug. 28, 2017, is incorporated into this application by reference.

At least one embodiment of the present disclosure relates to a hydrogenated silane composition. Specifically, at least one embodiment of the present disclosure relates to a hydrogenated silane composition in which a content of a linear hydrogenated silane is decreased.

Description of Related Art

A silicon thin film has been used for applications such as solar cells and semiconductors, and this silicon thin film has been previously prepared by a vapor deposition film-forming method (CVD method) using monosilane as a raw material. In addition, other reported methods for preparing silicon thin films include a CVD method using as a raw material a cyclic silane compound represented by a general formula $(SiH_2)_n$ (n=4, 5, or 6) (Patent Document 1), a CVD method using as a raw material cyclohexasilane (Patent Document 2), a method for producing a polysilane by forming a layer composed of a solution containing as a solute cyclopentasilane and cyclohexasilane on a substrate, and carrying out photopolymerization (Patent Document 3), and the like.

As a method for preparing a cyclic hydrogenated silane, Patent Document 4 discloses a method for preparing a cyclic hydrogenated silane in which a cyclization reaction of a halosilane is carried out under the presence of a given coordination compound to obtain a neutral complex of a cyclic halogenated silane, and the neutral complex of a cyclic halogenated silane is reduced to prepare the cyclic hydrogenated silane.

PRIOR ART DOCUMENTS

Patent Documents

Patent Document 1: Japanese unexamined patent application publication No. 1985-26664
Patent Document 2: Japanese unexamined patent application publication No. 2013-537705
Patent Document 3: Japanese unexamined patent application publication No. 2013-187261
Patent Document 4: Japanese unexamined patent application publication No. 2015-134755

SUMMARY OF THE INVENTION

Problems to be Solved by the Invention

Thus, the cyclic hydrogenated silane frequently has been used as film-forming materials of semiconductors in many years, and the cyclic hydrogenated silane having the storage stability has been required in the viewpoint of obtaining the uniform film as films suitably used in the semiconductors.

For example, in the case where a composition containing a cyclic hydrogenated silane contains a linear hydrogenated silane, the linear hydrogenated silane has more hydrogen atoms than those of the cyclic hydrogenated silane even if the number of the silicon atoms is the same between the cyclic hydrogenated silane and the linear hydrogenated silane, so that there is the possibility that vapor pressure is elevated by the influence of hydrogen bonds and the like. Therefore, when the linear hydrogenated silane is contained in a large amount, this may have an influence on vaporization of the cyclic hydrogenated silane, so that there is the need to control a ratio of the linear hydrogenated silane. Particularly, in the case where the linear hydrogenated silane having Si atoms of 5 or less in a relatively low order and having a high vapor pressure is contained in a large amount, the vapor pressure of the cyclic hydrogenated silane is changed to lower vaporization stability, so that the uniformity of the thin films is impaired in some cases.

In addition, when the linear hydrogenated silane is contained in a large amount in the composition containing the cyclic hydrogenated silane, the stability of the cyclic hydrogenated silane tends to decrease. Therefore, there is the need to control a ratio of the linear hydrogenated silane contained in the composition containing the cyclic hydrogenated silane in the viewpoints of not only the vaporization stability but also the stability.

The object of at least one embodiment of the present disclosure is to provide a hydrogenated silane composition containing a cyclic hydrogenated silane having high storage stability.

Solutions to the Problems

In at least one embodiment of the present disclosure, the hydrogenated silane composition is characterized in that a content ratio of a linear hydrogenated silane having Si atoms of 5 or less to a cyclic hydrogenated silane having Si atoms of 5 to 7 is 0.009 or less, and the cyclic hydrogenated silane contains at least cyclohexasilane.

Effects of the Invention

According to the present disclosure, the storage stability of the cyclic hydrogenated silane can be improved.

MODE FOR CARRYING OUT THE INVENTION

The hydrogenated silane composition of the present disclosure is characterized in that a content ratio of a linear hydrogenated silane having Si atoms of 5 or less to a cyclic hydrogenated silane having Si atoms of 5 to 7 is 0.009 or less, and the cyclic hydrogenated silane contains at least cyclohexasilane.

The content ratio of the linear hydrogenated silane having Si atoms of 5 or less to the cyclic hydrogenated silane having Si atoms of 5 to 7 is based on mass, and, for example, the content ratio can be determined based on gas chromatograms obtained in the following gas chromatography conditions and the following formula (1).

$$\text{(total area of gas chromatograms of linear hydrogenated silane having Si atoms of 5 or less)}/\text{(total area of gas chromatograms of cyclic hydrogenated silane having Si atoms of 5 to 7)} \quad (1)$$

Gas Chromatography Conditions
Detection: FID
Column: Agilent J&W GC column DB-5 ms Phenyl-Arylene polymer, 0.25 μm×0.25 mm×30 m
Temperature of vaporization chamber: 250° C.
Temperature of detector: 280° C.

Temperature elevating conditions: 1) at 50° C. for 5 minutes, 2) elevation of temperature up to 250° C. at a temperature elevating rate of 20° C./minute, 3) elevation of temperature up to 280° C. at a temperature elevating rate of 10° C./minute, and 4) at 280° C. for 10 minutes The area of the gas chromatograms means a total area of gas chromatograms of the cyclic hydrogenated silane or the linear hydrogenated silane obtained in gas chromatography conditions. A ratio of each of the cyclic hydrogenated silanes and each of the linear hydrogenated silanes may be determined from the area of the gas chromatograms.

The purity of the cyclic hydrogenated silane or the linear hydrogenated silane may be determined using a calibration curve method (mesitylene as a standard material) in place of a percentage method using an area of gas chromatograms.

The hydrogenated silane composition of the present disclosure may be those obtained by preparing cyclohexasilane of the cyclic hydrogenated silane, those obtained by solid-liquid separation of cyclohexasilane, and those obtained by distilling cyclohexasilane. In addition, in the case where the cyclic hydrogenated silane or the linear hydrogenated silane other than cyclohexasilane is prepared, those satisfying the above content ratio are included in the hydrogenated silane composition of the present disclosure.

The content ratio of a linear hydrogenated silane having Si atoms of 5 or less to a cyclic hydrogenated silane having Si atoms of 5 to 7 is 0.009 or less, preferably 0.004 or less, more preferably 0.003 or less, and even preferably 0.002 or less. A lower limit of the content ratio may be 0 or more, 0.00001 or more, or 0.00005 or more.

When the above content ratio is satisfied, as mentioned below, the storage stability of the cyclic hydrogenated silane is improved because a content of the linear hydrogenated silane having Si atoms of 5 or less is reduced as possible as. In addition, the vaporization stability on the film formation with vaporization is also improved.

The cyclic hydrogenated silane is represented by, for example, the following formula (2).

$$(SiH_2)_n \quad (2)$$

In the formula (2), n may be 3 to 12 without limiting particularly, and n is 5 to 7. Concretely, the cyclic hydrogenated silanes include cyclic hydrogenated silanes having no branched silyl group such as cyclopentasilane, cyclohexasilane; cyclic hydrogenated silanes having a branched silyl group such as silylcyclopentasilane, silylcyclohexasilane.

The cyclic hydrogenated silane is more preferably the cyclic hydrogenated silane having no branched silyl group.

In at least one embodiment of the present disclosure, a content of the cyclic hydrogenated silane of the hydrogenated silane composition is preferably 97% by mass or more, more preferably 97.5% by mass or more, and even preferably 98.0% by mass or more, per 100% by mass of the hydrogenated silane composition, and a content of the cyclic hydrogenated silane is desirably and extremely near 100% by mass and may be 99.9% by mass or less or 99.7% by mass or less.

The cyclic hydrogenated silane contains even preferably cyclopentasilane, cyclohexasilane, silylcyclopentasilane, and silylcyclohexasilane. The cyclic hydrogenated silane contains at least cyclohexasilane, and cyclohexasilane is contained as a main component of the cyclic hydrogenated silane in a content of 50% by mass or more per 100% by mass of the cyclic hydrogenated silane.

A content of cyclohexasilane is preferably 95% by mass or more, more preferably 95.5% by mass or more, even preferably 96.0% by mass or more, even more preferably 96.5% by mass or more per 100% by mass of the cyclic hydrogenated silane, and a content of cyclohexasilane is desirably and extremely near 100% by mass and may be 99.9% by mass or less or 99.7% by mass or less per 100% by mass of the cyclic hydrogenated silane.

A content of cyclohexasilane is preferably 97% by mass or more, more preferably 97.5% by mass or more, even preferably 98.0% by mass or more per 100% by mass of the cyclic hydrogenated silane and the linear hydrogenated silane, and a content of cyclohexasilane is desirably and extremely near 100% by mass, and may be 99.9% by mass or less or 99.7% by mass or less per 100% by mass of the cyclic hydrogenated silane and the linear hydrogenated silane.

The linear hydrogenated silane is represented by, for example, the following formula (3).

$$Si_nH_{2n+2} \quad (3)$$

In the formula (3), n may be 1 to 12 without limiting particularly. It is preferable that the hydrogenated silane composition of the present disclosure contains the linear hydrogenated silane of which n is 1 to 5 in the formula (3) in a given content.

Concrete examples of the linear hydrogenated silane include monosilane, disilane, trisilane, tetrasilane, and pentasilane.

In the case where the hydrogenated silane composition (preferably the cyclic hydrogenated silane, more preferably cyclohexasilane) is prepared through a given heat treatment, the content of the linear hydrogenated silane tends to increase. In addition, the storage stability of the cyclic hydrogenated silane tends to improve, by controlling the content of the linear hydrogenated silane having Si atoms of 5 or less in the hydrogenated silane composition.

A content of the linear hydrogenated silane having Si atoms of 5 or less is preferably 0.9% by mass or less, more preferably 0.4% by mass or less, even preferably 0.3% by mass or less, and particularly preferably 0.2% by mass or less per 100% by mass of the hydrogenated silane composition.

A content of the linear hydrogenated silane having Si atoms of 5 or less is desirably and extremely near 0% by mass and a total content thereof may be 0.001% by mass or more or 0.01% by mass or more per 100% by mass of the hydrogenated silane composition.

The hydrogenated silane composition of the present disclosure may contain the linear hydrogenated silane having Si atoms of 6 or more. A content of each of the linear hydrogenated silanes having Si atoms of 6 or more is preferably 2% by mass or less, more preferably 1% by mass or less, even preferably 0.2% by mass or less, and particularly preferably 0.1% by mass or less, per 100% by mass of the hydrogenated silane composition. A total content of the linear hydrogenated silane having Si atoms of 6 or more is more preferably within the above range. The total content of the linear hydrogenated silane having Si atoms of 6 or more may be zero, or 1 ppb or more. In one preferred embodiment of the hydrogenated silane composition of the present disclosure, a content ratio of the linear hydrogenated silane having Si atoms of 6 or more to a total of silylcyclopentasilane and silylcyclohexasilane is within the above range. In addition, in another preferred embodiment of the hydrogenated silane composition, a content ratio of normal hexasilane to a total of silylcyclopentasilane and silylcyclohexasilane is within the above range. The content of the linear hydrogenated silane having Si atoms of 6 or more or normal hexasilane is based on mass, and the content can be determined based on an area ratio of gas chromatograms obtained in gas chromatography conditions as described in the above.

In at least one embodiment of the present disclosure, the hydrogenated silane composition contains preferably monosilane, disilane, trisilane, tetrasilane, and pentasilane in a content within the above range.

The hydrogenated silane composition of the present disclosure contains the cyclic hydrogenated silane and the cyclic hydrogenated silane contains preferably at least one cyclic hydrogenated silane having a branched silyl group selected from silylcyclopentasilane and silylcyclohexasilane. In the hydrogenated silane composition of the present disclosure, a content ratio of a total of the silylcyclopentasilane and the silylcyclohexasilane to the cyclic hydrogenated silane having Si atoms of 5 to 7 is more preferably 10 ppb or more, even preferably 100 ppb or more, and particularly preferably 1 ppm or more on a mass basis. The film forming property tends to improve in the case where the hydrogenated silane composition of the present disclosure containing the cyclic hydrogenated silane having the branched silyl group in the above content is used for the film formation in gas such as CVD. In the hydrogenated silane composition of the present disclosure, a content ratio of the silylcyclopentasilane to the cyclic hydrogenated silane having Si atoms of 5 to 7 is more preferably 0.0080 or less and particularly preferably 0.0020 or less in the viewpoint of further improving the storage stability.

In the hydrogenated silane composition of the present disclosure, a content ratio of the silylcyclohexasilane to the cyclic hydrogenated silane having Si atoms of 5 to 7 is more preferably 0.05 or less, and particularly preferably 0.015 or less in the viewpoint of further improving the storage stability. The total content of the silylcyclopentasilane and the silylcyclohexasilane is based on mass and the content can be determined based on an area ratio of gas chromatograms obtained in the gas chromatography conditions as described in the above.

In at least one embodiment of the present disclosure, the hydrogenated silane composition may contain each of cyclopentasilane, silylcyclopentasilane, and silylcyclohexasilane in a content of 10 ppb or more.

In at least one embodiment of the present disclosure, using an appropriate method, the hydrogenated silane composition can be obtained by decreasing a content of the linear hydrogenated silane from the hydrogenated silane composition containing the cyclic hydrogenated silane obtained in various methods. A method for preparing the hydrogenated silane composition containing the cyclic hydrogenated silane before decreasing the content of the linear hydrogenated silane is not limited particularly, and various known methods can be used. Among these, a method for reducing a cyclic halosilane obtained from the cyclization of a halosilane is suitable.

Examples of the halosilane (the halogenated silane) include dihalogenated silanes such as dichlorosilane, dibromosilane, diiodosilane, difluorosilane; trihalogenated silanes such as trichlorosilane, tribromosilane, triiodosilane and trifluorosilane; and tetrahalogenated silanes such as tetrachlorosilane, tetrabromosilane, tetraiodosilane and tetrafluorosilane. Among these, trihalogenated silanes are preferable, and trichlorosilane is particularly preferable.

A method for cyclizing the halosilane is not limited particularly, and the following method (A) or (B) is preferred.

(A) a method for obtaining a salt of a cyclic halosilane by contacting a halosilane (a halogenated monosilane) with a phosphonium salt and/or an ammonium salt [hereinafter, referred to as method A in some cases]

(B) a method for obtaining a neutral complex of a cyclic halosilane by contacting a halosilane with at least one compound selected from the group consisting of the following (I) and (II) [hereinafter, referred to as method B in some cases]

(I) a compound represented as $XR_n$ [hereinafter, referred to as compound I in some cases] (when X is P or P=O, n=3 and each R represents a substituted or unsubstituted alkyl group or aryl group and each R is the same or different; when X is S, S=O or O, n=2 and each R represents a substituted or unsubstituted alkyl group or aryl group and each R is the same or different; when X is CN, n=1 and each R represents a substituted or unsubstituted alkyl group or aryl group, and the number of amino groups in $XR_n$ is 0 or 1)

(II) at least one heterocyclic compound selected from the group consisting of substituted or unsubstituted N-, O-, S- or P-containing heterocyclic compounds that have an unshared electron pair in the ring [hereinafter, referred to as compound II in some cases] (the number of tertiary amino groups as the substituent of the heterocyclic compound is 0 or 1).

First, the above method A is explained.

The phosphonium salt is preferably a quaternary phosphonium salt, and preferably includes a salt represented by the following general formula (11). In the following formula (11), each of $R^1$ to $R^4$ may different, and all of $R^1$ to $R^4$ is preferably the same group.

[Chemical Formula 1]

(11)

In addition, the ammonium salt is preferably a quaternary ammonium salt, and preferably includes a salt represented by the following general formula (12). In the following formula (12), each of $R^5$ to $R^8$ may different, and all of $R^5$ to $R^8$ is preferably the same group.

[Chemical Formula 2]

(12)

In the above formulas (11) and (12), $R^1$ to $R^4$ and $R^5$ to $R^8$ each independently represent a hydrogen atom, an alkyl group or an aryl group; and $A^-$ represents a monovalent anion.

The examples of alkyl groups of $R^1$ to $R^4$ and $R^5$ to $R^8$ preferably include alkyl groups having a carbon number of 1 to 16 such as a methyl group, an ethyl group, a propyl group, a butyl group, a pentyl group, a hexyl group, a heptyl group, an octyl group and a cyclohexyl group. The alkyl groups of $R^1$ to $R^4$ and $R^5$ to $R^8$ are more preferably an alkyl group having a carbon number of 1 to 8.

The examples of the aryl groups of $R^1$ to $R^4$ and $R^5$ to $R^8$ preferably include aryl groups having a carbon number of 6 to 18 such as a phenyl group and a naphthyl group. The aryl groups of $R^1$ to $R^4$ and $R^5$ to $R^8$ are more preferably an aryl group having a carbon number of 6 to 12.

Each of $R^1$ to $R^4$ and $R^5$ to $R^8$ is preferably an alkyl group or an aryl group, and more preferably an aryl group. When $R^1$ to $R^4$ and $R^5$ to $R^8$ are aryl groups, as mentioned below, a salt of a cyclic halosilane is easily obtained at high purity because the salt of the cyclic halosilane is precipitated in a reaction solution in the preparation of the salt of the cyclic halosilane.

In the above formulas (11) and (12), the monovalent anion represented by $A^-$ includes halide ions ($Cl^-$, $Br^-$, $I^-$, and the like), borate ions ($BF_4^-$ and the like), and phosphorous anions ($PF_6^-$ and the like). Among them, halide ions are preferable, $Cl^-$, $Br^-$ and $I^-$ are more preferable, and $Cl^-$ and $Br^-$ are particularly preferable, from the viewpoint of easy availability.

One or both of the phosphonium salt and the ammonium salt may be used. The phosphonium salt may be used individually or in two or more phosphonium salts. The ammonium salt may be used individually or in two or more ammonium salts. In addition, the phosphonium salt and the ammonium salt may be generated from a corresponding tertiary phosphine and tertiary amine in a reacting system.

The amount of the phosphonium salt and/or the ammonium salt to be used or the total amount thereof in the case where two or more kinds are used is preferably not less than 0.01 mol, more preferably not less than 0.05 mol, further preferably not less than 0.08 mol, and preferably not more than 1.0 mol, more preferably not more than 0.7 mol, and further preferably not more than 0.5 mol, based on 1 mol of the halosilane. When the amount of the phosphonium salt and/or the ammonium salt is within the above range, there is a tendency to improve the yield of the salt of the cyclic halosilane.

The above method A is preferably carried out under the presence of a chelate ligand such as a polyether compound, a polythioether compound and a polydentate phosphine compound. When the cyclization coupling reaction of the method A is carried out under the presence of the chelate ligand, the salt of the cyclic halosilane can be efficiently produced. In addition, the number of a hydrogen atom or a composition ratio in the obtained cyclic halosilane can be adjusted by appropriately selecting a kind of the chelate ligand to be used.

Examples of the polyether compound include, for example, dialkoxyalkanes such as 1,1-dimethoxyethane, 1,2-dimethoxyethane, 1,2-diethoxyethane, 1,2-dipropoxyethane, 1,2-diisopropoxyethane, 1,2-dibutoxyethane, 1,3-dimethoxypropane, 1,3-diethoxypropane, 1,3-dipropoxypropane, 1,3-diisopropoxypropane, 1,3-dibutoxypropane, 1,4-dimethoxybutane, 1,4-diethoxybutane, 1,4-dipropoxybutane, 1,4-diisopropoxybutane, and 1,4-dibutoxybutane; diaryloxyalkanes such as 1,2-diphenoxyethane, 1,3-diphenoxypropane, and 1,4-diphenoxybutane. Among these, 1,2-dimethoxyethane is particularly preferable.

Examples of the polythioether compound include those in which oxygen atom of the polyether compounds exemplified above is substituted with sulfur atom.

Examples of the polydentate phosphine compound include, for example, bis (dialkylphosphino) alkanes such 1,2-bis (dimethylphosphino) ethane, 1,2-bis (diethylphosphino) ethane, 1,2-bis (dipropylphosphino) ethane, 1,2-bis (dibutylphosphino) ethane, 1,2-bis (diphenylphosphino) ethane, 1,3-bis (dimethylphosphino) propane, 1,3-bis (diethylphosphino) propane, 1,3-bis (dipropylphosphino) propane, 1,3-bis (dibutylphosphino) propane, 1,3-bis (diphenylphosphino) propane, 1,4-bis (dimethylphosphino) butane, 1,4-bis (diethylphosphino) butane, 1,4-bis (dipropylphosphino) butane, 1,4-bis (dibutylphosphino) butane and 1,4-bis (diphenylphosphino) butane, and bis (diarylphosphino) alkanes. Among them, 1,2-bis (diphenylphosphino) ethane is particularly preferable.

The used amount of the chelate ligand may be appropriately adjusted, and is preferably 0.01 mol or more, more preferably 0.05 mol or more, even more preferably 0.1 mol or more, and preferably 50 mol or less, more preferably 40 mol or less, and even preferably 30 mol or less, per 1 mol of the halosilane.

As the salt of the cyclic halosilane obtained in the method A, a compound represented by the following formula (13) is preferably used.

[Chemical Formula 3]

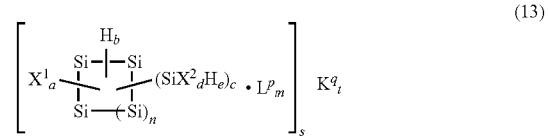

(13)

In the above formula (13), $X^1$ and $X^2$ each independently represent a halogen atom; L represents an anionic ligand; p is an integer of −2 to 0 as a valence of the ligand L; K represents a counter cation; q is an integer of 0 to 2 as a valence of the counter cation K; n is an integer of 0 to 5; a, b and c are integers of 0 to 2n+6, wherein a+b+c=2n+6 but a and c are not simultaneously 0; d is an integer of 0 to 3, wherein a and d are not simultaneously 0; e is an integer of 0 to 3, wherein d+e=3; m is a number of 1 to 2; s is an integer of 1 or more; and t is an integer of 1 or more.

The salt of the cyclic halosilane may be contacted and reacted with a Lewis acid to obtain a free cyclic halosilane. The free cyclic halosilane means noncomplex cyclic halosilanes such as $Si_5Cl_{10}$, $Si_6Cl_{12}$, or $Si_6Cl_{11}H$ in which a part of halogen atoms is substituted with hydrogen. Concretely, the corresponding free cyclic halosilane can be obtained by contacting a salt of a cyclic halosilane with a Lewis acid, making the Lewis acid electrophilically act on an anionic ligand contained in the salt of the cyclic halosilane, and extracting the anionic ligand from the salt of the cyclic halosilane to separate a counter cation.

The kind of the Lewis acid is not particularly restricted, and it is preferable to use a metal halide. Examples of the metal halide include metal chlorides, metal bromides, metal iodides and others, and from the viewpoint of the reactivity and ease of control of the reaction, a metal chloride is preferably used. Examples of the metal element constituting the metal halide include group 13 elements such as boron, aluminum, gallium, indium and thallium; group 11 elements such as copper, silver and gold; group 4 elements such as titanium and zirconium; iron, zinc, calcium and others. Specific examples of the Lewis acid include boron halides such as boron trifluoride, boron trichloride and boron tribromide; aluminum halides such as aluminum chloride and aluminum bromide; gallium halides such as gallium chloride and gallium bromide; indium halides such as indium chloride and indium bromide; thallium halides such as thallium chloride and thallium bromide; copper halides such as copper chloride and copper bromide; silver halides such as silver chloride and silver bromide; gold halides such as gold chloride and gold bromide; titanium halides such as titanium chloride and titanium bromide; zirconium halides such as zirconium chloride and zirconium bromide; iron halides such as iron chloride and iron bromide; zinc halides such as zinc chloride and zinc bromide; calcium halides such as calcium chloride and calcium bromide; and others.

The used amount of the Lewis acid may be appropriately adjusted depending on the reactivity of the salt of the cyclic halosilane with the Lewis acid, and is, for example, preferably 0.5 mol or more, more preferably 1.5 mol or more, and preferably 20 mol or less, more preferably 10 mol or less, relative to 1 mol of the salt of the cyclic halosilane.

The reaction of the salt of the cyclic halosilane with the Lewis acid is preferably carried out in a solvent or a dispersion medium that is simply referred to as a solvent. Examples of the solvent (reaction solvent) used in the reaction include hydrocarbon solvents such as hexane, toluene; ether solvents such as diethyl ether, tetrahydrofuran, cyclopentyl methyl ether, diisopropyl ether and methyl tertiary-butyl ether; and others. These organic solvents may be used individually or two or more of them may be used in combination. In order to remove water and dissolved oxygen contained in the reaction solvent, it is preferable that the reaction solvent is subjected to purification such as distillation and dehydration prior to the reaction.

Reaction temperature upon carrying out the reaction of the salt of the cyclic halosilane with the Lewis acid may be appropriately adjusted depending on the reactivity, and is preferably −80° C. or higher, more preferably −50° C. or higher, even preferably −30° C. or higher, and preferably 200° C. or lower, more preferably 150° C. or lower, and even preferably 100° C. or lower.

Next, the above method B is explained.

In $XR_n$ of the above compound I, X is coordinated to the cyclic halosilane to form a neutral complex of the cyclic halosilane. When X is P or P=O, X is trivalent, and n representing the number of R is 3. Each R represents a substituted or unsubstituted alkyl group or aryl group and each R is the same or different. R is more preferably a substituted or unsubstituted aryl group. Examples of R as the alkyl group include linear, branched or cyclic alkyl groups, and preferably alkyl groups having 1 to 16 carbon atoms, such as a methyl group, an ethyl group, a propyl group, a butyl group, a pentyl group, a hexyl group, a heptyl group, an octyl group and a cyclohexyl group. Preferable examples of R as the aryl group include aryl groups having about 6 to 18 carbon atoms, such as a phenyl group and a naphthyl group.

In $XR_n$ of the compound I, when X is N and the number of an amino group is 1 in $XR_n$, X is coordinated to the cyclic halosilane to form the neutral complex of the cyclic halosilane. When X is N, X is trivalent, and n representing the number of R is 3. Each R represents a substituted or unsubstituted alkyl group or aryl group and each R is the same or different. R is more preferably a substituted or unsubstituted alkyl group. Examples of R as the alkyl group include linear, branched or cyclic alkyl groups, and preferably alkyl groups having 1 to 16 carbon atoms, more preferably alkyl groups having 1 to 4 carbon atoms, such as a methyl group, an ethyl group, a propyl group and a butyl group, and even preferably alkyl groups having 1 to 3 carbon atoms. Preferable examples of R as the aryl group include aryl groups having about 6 to 18 carbon atoms, such as a phenyl group and a naphthyl group.

When X is P, P=O, or N in $XR_n$, the substituent that may be possessed by the alkyl group is, for example, an alkoxy group, an amino group, a cyano group, a carbonyl group and a sulfonyl group, and the substituent that may be possessed by the aryl group is, for example, an alkoxy group, an amino group, a cyano group, a carbonyl group and a sulfonyl group. Examples of the amino group include a dimethylamino group and a diethylamino group, and the number of the amino groups is not more than 1 in $XR_3$. This is intended to eliminate a tertiary polyamine. In the meantime, three Rs may be the same or different.

When X is S, S=O, or O, X is divalent, and n representing the number of R is 2. R is the same as R in the case where X is P, P=O, and R is preferably a substituted or unsubstituted alkyl group or aryl group. R is more preferably a substituted or unsubstituted aryl group. In addition, when X is CN, X is monovalent, and n representing the number of R is 1. R is the same as R in the case where X is P, P=O, and R is preferably a substituted or unsubstituted alkyl group or aryl group. R is more preferably a substituted or unsubstituted aryl group.

Specific examples of the compound I include a compound in which X is P, or P=O, such as triphenylphosphine ($PPh_3$), triphenylphosphine oxide ($Ph_3P=O$), tris(4-methoxyphenyl)phosphine ($P(MeOPh)_3$); a compound in which X is S=O such as dimethyl sulfoxide; and a compound in which X is CN such as p-toluenitrile (referred to as p-methylbenzonitrile).

The heterocyclic compound of the above (II) or the compound II is required to have an unshared electron pair in the ring, and the unshared electron pair coordinates to a cyclic halosilane to form a neutral complex of the cyclic halosilane. Examples of such a heterocyclic compound include at least one substituted or unsubstituted N-, O-, S- or P-containing heterocyclic compound that has an unshared electron pair in the ring. The substituents that may be possessed by the heterocyclic compound are the same as the substituents that may be possessed by R as an aryl group. Examples of the heterocyclic compound include pyridines, imidazoles, pyrazoles, oxazoles, thiazoles, imidazolines, pyrazines, thiophenes and furans, and specific examples include N,N-dimethyl-4-aminopyridine, tetrahydrothiophene, and tetrahydrofuran.

Among the compound I and the compound II, a compound that is a liquid at a reaction temperature can also play a role of a solvent.

An amount of the compound I and the compound II may be determined appropriately. The compound I and the compound II is used in an amount of preferably 0.1 to 50 mol, and more preferably 0.5 to 3 mol, per 6 mol of a halosilane.

The neutral complex of a cyclic halosilane obtained in the above method B contains silicon atoms of 3 to 8, preferably 5 or 6, particularly preferably 6 of the halosilane as a raw material and a ring of which each of silicon atoms is bonded to each other, and the neutral complex of a cyclic silane is represented by the general formula $[Y]_1[Si_mZ_{2m-a}H_a]$. In the above general formula, Y is the above compound I or the above compound II, each Z represents a halogen atom of any of Cl, Br, I and F and each Z is the same or different, 1 is 1 or 2, m is 3 to 8, preferably 5 or 6, particularly preferably 6, and a is 0 to 2 m-1, preferably 0 to m.

The cyclization reaction of the halosilane in the methods A and B is preferably conducted by adding a tertiary amine. Thereby, produced hydrochloric acid can be neutralized by adding the tertiary amine.

Specific examples of the tertiary amine used in the cyclization reaction preferably include triethylamine, tripropylamine, tributylamine, trioctylamine, triisobutylamine, triisopentylamine, diethylmethylamine, diisopropylethylamine (DIPEA), dimethylbutylamine, dimethyl-2-ethylhexylamine, diisopropyl-2-ethylhexylamine, methyldioctylamine, and the like.

Here, the tertiary amine may be used individually or in combination of two or more thereof. The tertiary amine also includes one that is coordinated to a cyclic halosilane, and amines that are comparatively low in volume and are symmetry, such as diethylmethylamine and triethylamine, are considered to be comparatively efficiently coordinated. However, only with a tertiary amine represented by $XR_n$ of the above compound I, the yield of the neutral complex of a cyclic halosilane tends to decrease, and therefore, a compound I other than the tertiary amines is preferably used in combination.

The tertiary amine is used in an amount of preferably 0.5 to 4 mol relative to 1 mol of a halosilane, and particularly preferably the same mol as 1 mol of a halosilane.

Without limiting particularly, in at least one embodiment of the present disclosure, it is preferable that a tertiary polyamine having two or more carbon atoms and having three or more amino groups is not used. The use of the tertiary polyamine is not preferred in the viewpoint of the safety because a salt of a cyclic halosilane containing a silicon atom in the counter cation is produced and silane gas is generated in the storage and the reduction reaction.

The cyclization reaction of the halosilane in the above methods A and B can be conducted in an organic solvent as necessary. As the organic solvent, a solvent that does not prevent the cyclization reaction is preferred, and preferable examples thereof include hydrocarbon-based solvents (e.g. hexane, heptane, benzene, and toluene), halogenated hydrocarbon-based solvents (e.g. chloroform, dichloromethane and 1,2-dichloroethane), ether-based solvents (e.g. diethyl ether, tetrahydrofuran, cyclopentylmethyl ether, diisopropyl ether, and methyl tertiary-butyl ether) and aprotic polar solvents such as acetonitrile. Among these, the chlorinated hydrocarbon-based solvents such as chloroform, dichloromethane and 1,2-dichloroethane are preferred. These organic solvents may be used individually or in combination of two or more thereof.

The amount of the organic solvent to be used is not particularly limited, and it is generally preferred to be adjusted so that the concentration of the halosilane is preferably 0.5 to 10 mol/L, more preferably 0.8 to 8 mol/L, and further preferably 1 to 5 mol/L.

The reaction temperature in the cyclization reaction can be appropriately set according to the reactivity and is, for example, about 0 to 120° C., preferably about 15 to 70° C. Further, the cyclization reaction is recommended to be conducted in an atmosphere of inert gas such as nitrogen.

After the cyclization reaction, a reaction solution containing the cyclic halosilane is preferably washed with a non-halogen solvent. In other words, after the cyclization reaction, a solution or dispersion containing the cyclic halosilane (the salt of the cyclic halosilane, the free cyclic halosilane, the neutral complex of the cyclic halosilane) is produced. In addition, the solution or the dispersion containing the cyclic halosilane is concentrated or filtered to prepare a solid of the cyclic halosilane, and the solid may be washed with the halogen solvents such as chloroform, dichloromethane, 1,2-dichloroethane, and the non-halogen solvents such as acetonitrile and hexane to purify the solid of the cyclic halosilane. By washing the cyclic halosilane with the non-halogen solvents, a content of impurities such as halogen elements contained in the hydrogenated silane composition tends to remarkably decrease.

Before washing with the non-halogen solvent, the cyclic halosilane is preferably washed with the halogen solvent. An amine hydrochloride can be removed by washing with the halogen solvent and the halogen solvent can be removed by washing with the non-halogen solvent. When the amount of the halogen solvent contained in the solid or solution of the cyclic halosilane is decreased because the halogen solvent is reacted with various reducing agents, the yield of the hydrogenated silane tends to improve at the subsequent reduction reaction.

Washing with the halogen solvent and washing with the non-halogen solvent may be carried out one time or two or more times, respectively.

The cyclic halosilane can be obtained by the purification as a solid having high purity. In addition, the cyclic halosilane can be obtained as a composition containing the cyclic halosilane and impurities if necessary. The composition containing the cyclic halosilane contains the cyclic halosilane in a content of preferably 80% by mass or more, more preferably 90% by mass or more, and even preferably 95% by mass or more. The upper limit of the content of the cyclic halosilane is, for example, 99.99% by mass. Examples of the impurities include a solvent, a residue of the compound I or the compound II, a degradation product of the cyclic halosilane, a halosilane polymer, and the like. A content of the impurities in the composition containing the cyclic halosilane is preferably 20% by mass or less, more preferably 10% by mass or less, and even preferably 5% by mass or less, and the lower limit of the content of the impurities is, for example, 0.01% by mass.

The hydrogenated silane composition containing the cyclic hydrogenated silane can be prepared by reducing the cyclic halosilanes (the salt of the cyclic halosilane, the free cyclic halosilane, the neutral complex of the cyclic halosilane). The reduction step is preferably carried out under the presence of the reducing agent.

The reducing agent that can be used in the reduction step is not particularly limited, and one or more reducing agents selected from the group consisting of aluminum-based reducing agents and boron-based reducing agents are preferably used. Examples of the aluminum-based reducing agent include metal hydrides such as lithium aluminum hydride ($LiAlH_4$; LAH), diisobutyl aluminum hydride (DIBAL) and bis(2-methoxyethoxy) aluminum sodium hydride ("Red-Al" (registered trade mark of Sigma-Aldrich Corporation). Examples of the boron-based reducing agent include metal hydrides such as sodium borohydride and lithium triethylborohydride, and diborane. It is preferable that a metal hydride is used as the reducing agent. The reducing agents may be used individually or in combination of two or more thereof.

An amount of the reducing agent in the reduction step may be set appropriately, and an equivalent of a hydride of the reducing agent to one of silicon-halogen bond of the cyclic halosilane is preferably at least 0.9 equivalent or more. The amount of the reducing agent is adjusted to be more preferably 1.0 to 50 equivalents, even preferably 1.0 to 30 equivalents, particularly preferably 1.0 to 15 equivalents, and most preferably 1.0 to 2 equivalents. When the amount of the reducing agent is too much large, the productivity tends to decrease due to much times required for the post-treatment. On the other hand, when the amount of the reducing agent is too much small, the yield tends to decrease due to halogens without reducing. Further, a content of the linear hydrogenated silane of the hydrogenated silane composition tends to decrease, by reducing an amount of the reducing agent used in the reducing reaction and the hydrogenated silane composition containing the cyclic hydrogenated silane having the branched silyl group in an appropriate content tends to be easily obtain.

Further, a Lewis acid catalyst may be used as a reduction auxiliary in combination with the above reducing agents in the reduction step. The Lewis acid catalyst may be metal halide compounds including metal chlorides such as aluminum chloride, titanium chloride, zinc chloride, tin chloride and iron chloride; metal bromides such as aluminum bromide, titanium bromide, zinc bromide, tin bromide and iron bromide; metal iodides such as aluminum iodide, titanium iodide, zinc iodide, tin iodide and iron iodide; and metal fluorides such as aluminum fluoride, titanium fluoride, zinc fluoride, tin fluoride and iron fluoride. These Lewis acid catalysts may be used individually or in combination of two or more thereof.

The reduction reaction can be carried out under the presence of an organic solvent as necessary. Examples of the organic solvent include hydrocarbon-based solvents such as hexane and toluene; and ether-based solvents such as diethyl ether, tetrahydrofuran, cyclopentyl methyl ether, diisopropyl ether, and methyl tertiary butyl ether. These organic solvents may be used individually or in combination of two or more thereof. The organic solvent solution obtained in the production of the cyclic halosilane may be directly used as an organic solvent solution in the reduction step, or an organic solvent may be distilled off from an organic solvent solution containing the cyclic halosilane and a newly added organic solvent may be used in the reduction step. Here, the organic solvent to be used in the reduction reaction is preferably subjected to purification such as distillation or dehydration before the reaction in order to remove water and dissolved oxygen contained therein.

An amount of the organic solvent to be used in the reduction reaction is adjusted such that the concentration of a cyclic halosilane is preferably 0.01 to 1 mol/L, more preferably to 0.02 to 0.7 mol/L, and further preferably to 0.03 to 0.5 mol/L. When the reduction reaction is carried out in the above range, a content of the impurities such as halogen elements contained in the hydrogenated silane composition tends to remarkably decrease.

The reduction can be carried out by bringing the cyclic halosilane into contact with the reducing agent. When the cyclic halosilane is brought into contact with the reducing agent, the contact is preferably carried out under the presence of a solvent. In order to contact the cyclic halosilane with the reducing agent under the presence of the solvent, for example, (a) the reducing agent is directly added to a solution or a dispersion of the cyclic halosilane, (b) a solution or a dispersion obtained by dissolving or dispersing the reducing agent in the solvent is added to a solution or a dispersion of the cyclic halosilane, (c) the cyclic halosilane and the reducing agent are simultaneously or sequentially added to the solvent, and the like may be adopted. Among them, the embodiment (b) is particularly preferable.

Also, when the cyclic halosilane is brought into contact with the reducing agent, it is preferred that at least one of the solution or the dispersion of the cyclic halosilane and the solution or the dispersion of the reducing agent is added dropwise to the reaction system in which the reduction is carried out. One or both of the cyclic halosilane and the reducing agent are added dropwise as described above, whereby exothermic generated in the reduction reaction can be controlled by the dropwise addition rate or the like, thus an effect of leading to improved productivity can be obtained such that it is possible to downsize a condenser or the like.

The preferred embodiment when one or both of the cyclic halosilane and the reducing agent are added dropwise includes the following three embodiments. That is, A) an embodiment in which a solution or dispersion of the cyclic halosilane is charged in the reactor, and a solution or dispersion of the reducing agent is added dropwise thereto, B) an embodiment in which a solution or dispersion of the reducing agent is charged in the reactor, and a solution or dispersion of the cyclic halosilane is added dropwise thereto, and C) an embodiment in which a solution or dispersion of the cyclic halosilane and a solution or dispersion of the reducing agent are simultaneously or sequentially added dropwise to the reactor. Among them, the embodiment A) is preferable.

When one or both of the cyclic halosilane and the reducing agent are added dropwise by the embodiments A) to C), the concentration in the solution or dispersion containing the cyclic halosilane is preferably not less than 0.01 mol/L, more preferably not less than 0.02 mol/L, further preferably not less than 0.04 mol/L, and particularly preferably not less than 0.05 mol/L. When the concentration of the cyclic halosilane is too low, the amount of the solvent that needs to be removed by distillation when isolating the objective product is increased, and thus the productivity tends to be lowered. On the other hand, the upper limit of the concentration in the solution or dispersion containing the cyclic halosilane is preferably not more than 1 mol/L, more preferably not more than 0.8 mol/L, and further preferably not more than 0.5 mol/L.

The lower limit of the temperature during dropwise addition (specifically, the temperature of a solution or a dispersion during dropwise addition) is preferably $-198°$ C., more preferably $-160°$ C., further preferably $-100°$ C. The upper limit of the temperature during dropwise addition is preferably $+150°$ C., more preferably $+100°$ C., further preferably $+80°$ C., and particularly preferably $+40°$ C. The temperature of a reaction container (reaction temperature) may be appropriately set according to the types of a cyclic halosilane and a reducing agent, and generally, the lower limit is preferably set to $-198°$ C., more preferably $-160°$ C., further preferably $-100°$ C. The upper limit of the temperature of a reaction container (reaction solution) is preferably $+150°$ C., more preferably $+100°$ C., further preferably $+80°$ C., and particularly preferably $+40°$ C. When the reaction temperature is low, the decomposition or polymerization of an intermediate product or an object product can be suppressed, resulting in improvement of yield. The reaction time may be properly determined depending on the extent of reaction progress, and is usually not less than 10 minutes and not more than 72 hours, preferably not less than 1 hour and not more than 48 hours, and more preferably not less than 2 hours and not more than 24 hours.

As one example, a scheme example using in the above method B trichlorosilane as the halosilane, triphenylphosphine (PPh$_3$) as the compound I, N,N-diisopropylethylamine (DIPEA) as the tertiary amine is shown below.

[Chemical Formula 4]

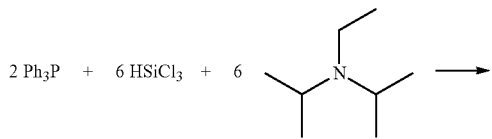

[PPh₃]₂[Si₆Cl₁₂] + 6 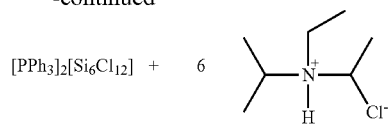

For example, when trichlorosilane is used as a starting material and triphenylphosphine (PPh₃) is used as the compound I, a complex containing 6-membered ring dodecachlorocyclohexasilane (neutral complex including triphenylphosphine coordinated to dodecachlorocyclohexasilane ([PPh₃]₂[Si₆Cl₁₂])) is generally produced as in the above scheme. This neutral complex of a cyclic halosilane does not contain any silicon atom other than the silicon atoms that form the ring structure, and therefore, in the reduction, alkylation or arylation, silane gas and organic monosilane are not generated, or silane gas and organic monosilane are decreased in a small amount even if silane gas and organic monosilane are generated.

The yield and yield constant of the neutral complex of a cyclic halosilane produced in the cyclization reaction can be calculated by a methylation reaction represented by the following scheme, in which the complex reacts quantitatively.

[Chemical Formula 5]

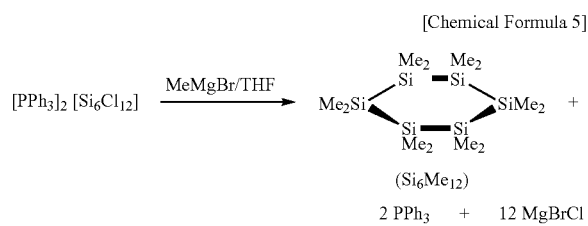

As a method for reducing a neutral complex of a cyclic halosilane (e.g. [PPh₃]₂[Si₆Cl₁₂]) to obtain a cyclic hydrogenated silane (e.g. cyclohexasilane), for example, when LiAlH₄ is used as a reducing agent, the scheme is represented as follows.

[Chemical Formula 6]

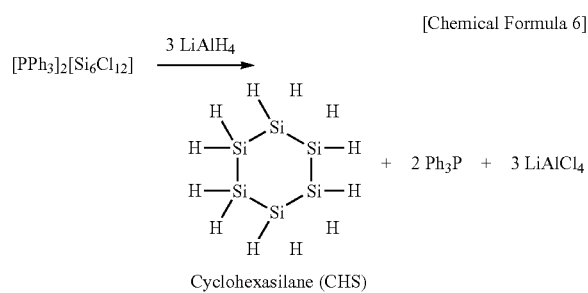

Hereinafter, many methods for reducing a content of the linear hydrogenated silane of the hydrogenated silane composition are provided together the above method, and it is recommended that appropriate methods are combined based on the degree of decreasing the content of the linear hydrogenated silane. That is, in the case where the content of the linear hydrogenated silane cannot be decreased to an intended content in one method, multiple methods may be combined to decrease the content of the linear hydrogenated silane to a desired content.

It is preferred that the reduction reaction is usually carried out under an atmosphere of an inert gas such as nitrogen gas or argon gas.

The hydrogenated silane composition containing the cyclic hydrogenated silane produced in the reduction reaction can be isolated by, for example, subjecting the reaction liquid obtained after the reduction to solid-liquid separation to separate a solid (impurities such as a salt of a by-product), distilling off the solvent under reduced pressure to distill the hydrogenated silane composition.

As a method of solid-liquid separation, filtration is preferably employed for its simpleness, and the method is not limited thereto, and common solid-liquid separations such as centrifugation and decantation can be appropriately employed.

As mentioned above, a content of the linear hydrogenated silane of the hydrogenated silane composition tends to decrease, by washing the hydrogenated silane composition containing the cyclic hydrogenated silane obtained the reduction reaction with the non-halogen solvent or carrying out solid-liquid separation at least two times. According to the above method, the hydrogenated silane composition containing the cyclic hydrogenated silane having the branched silyl group in an appropriate content tends to be easily obtained.

For example, it is preferable that the solid-liquid separation is carried out at least two times after reducing the cyclic halosilane. For example, a solution or a solid containing the hydrogenated silane composition is subjected to solid-liquid separation (first separation), the solution containing the hydrogenated silane composition is preferably concentrated, the hydrocarbon solvent such as hexane is added as a solvent for dilution thereto, the hydrogenated silane composition is preferably concentrated, a precipitated solid is again subjected to solid-liquid separation (second separation), and operations from the first separation to the second separation may be repeated if necessary. After the first separation, the solvent dilution, the concentration, and the solid-liquid separation are more preferably carried out one or more times. These may be repeated multiple times. Thus, when the solid-liquid separation is carried out at least two times, byproducts of the linear hydrogenated silane can be controlled, and a content of the linear hydrogenated silane of the hydrogenated silane composition can be decreased. Thus, when the content of the linear hydrogenated silane is decreased, the cyclic hydrogenated silane (preferably cyclohexasilane) can be distilled without requiring useless energy.

The solid-liquid separation may be two times or three or times. The number of the solid-liquid separation is not limited particularly, and the upper limit of the solid-liquid separation is about five times in the viewpoint of the productivity.

Next, if necessary, a solution containing the hydrogenated silane composition obtained by the solid-liquid separation is concentrated, and the hydrogenated silane composition (preferably cyclic hydrogenated silane, more preferably cyclohexasilane) having high concentration is preferably distilled. The distillation is preferably distillation under reduced pressure. A method for distilling under reduced pressure is not limited particularly, and the distillation under the reduced pressure may be carried out in known distillation column and may be carried out under light shielding conditions. When the inner temperature of the distillation bottom is lowered by setting a heating temperature into a low temperature at the distillation, a content of the linear hydrogenated silane of the hydrogenated silane composition tends to decrease, and the hydrogenated silane composition containing the cyclic hydrogenated silane having the branched silyl group in an appropriate content tends to be easily obtained. The distillation is preferably carried out by dividing the whole fraction into multiple fractions and an appropriate fraction may be selected from obtained fractions, taking into the consideration of the content of the linear hydrogenated silane. In the case where many fractions corresponding to first fraction at the distillation are removed, a content of the linear hydrogenated silane of the hydrogenated silane composition tends to decrease, and the hydrogenated silane composition containing the cyclic hydrogenated silane having the branched silyl group in an appropriate content tends to be easily obtained.

One method for decreasing a content of the linear hydrogenated silane of the hydrogenated silane composition includes a method for carrying out a distillation (particularly distillation under reduced pressure) two or more times. For example, a solution containing the hydrogenated silane composition is distilled under the reduced pressure, an appropriate fraction containing the cyclic hydrogenated silane (particularly cyclohexasilane) in an appropriate content is collected (first distillation), the collected fraction is again distilled under the reduced pressure to collect an appropriate fraction containing the cyclic hydrogenated silane (particularly cyclohexasilane) in an appropriate content (second distillation), and the second distillation may be repeated if necessary.

In the case where the distillation under reduced pressure is carried out two or more times, a temperature of a solution (an inner temperature) at the previous distillation under reduced pressure is preferably 25 to 80° C., more preferably 30 to 70° C., even preferably 30 to 50° C., and a temperature of a solution (an inner temperature) at the post distillation under reduced pressure is preferably 20 to 75° C., more preferably 30 to 65° C., and even preferably 35 to 60° C. Further, the temperature of the solution at the previous distillation under reduced pressure may be the same as the temperature of the solution at the post distillation under reduced pressure.

In the case where the distillation under reduced pressure is carried out two or more times, the previous distillation under reduced pressure may be carried out at preferably 5 to 400 Pa, more preferably 10 to 300 Pa, even preferably 15 to 300 Pa, and the post distillation under reduced pressure may be carried out at preferably 5 to 300 Pa, more preferably 10 to 200 Pa, even preferably 20 to 150 Pa, and even more preferably 60 Pa or more. The pressure of the previous distillation under reduced pressure may be the same as the pressure of the post distillation under reduced pressure.

The distillation under reduced pressure may be carried out in batch because impurities having a higher boiling point than that of the cyclic hydrogenated silane and impurities having a lower boiling point than that of the cyclic hydrogenated silane are separated, and a content of the linear hydrogenated silane is decreased in the hydrogenated silane composition.

It is preferable that a first fraction is removed from all distilled fractions in the distillation under reduced pressure. Particularly, it is preferable that 2% or more is removed as the first fraction from all distilled fractions on a mass basis.

In at least one embodiment of the present disclosure, the storage stability of the cyclic hydrogenated silane may be evaluated with the following formula in the case where the cyclic hydrogenated silane is restored at 20° C. for one month in a container (for example, SUS container, preferably surface-polished SUS container, more preferably electro-polished SUS container) having the light shielding property and the pressure resistance.

$$(\text{GC purity } (X) \text{ of sample restored at } 20° \text{ C. for one month/GC purity } (Y) \text{ of sample}) \times 100 \quad (Z)$$

A value of the formula (Z) is preferably 98.0% or more, more preferably 98.5% or more, even preferably 99.0% or more, and even more preferably 99.5% or more in the viewpoint of the storage stability for long time of the cyclic hydrogenated silane. The upper limit of the formula (Z) may be 99.999%, or 99.99%.

In at least one embodiment of the present disclosure, the hydrogenated silane composition is characterized in that a content ratio of the linear hydrogenated silane having Si atoms of 5 or less to the cyclic hydrogenated silane having Si atoms of 5 to 7 is decreased by 0.009 or less. Therefore, the storage stability of the cyclic hydrogenated silane (preferably cyclohexasilane) can be improved.

EXAMPLE

The present disclosure will be more specifically described below with reference to Examples, but the present disclosure is not limited to the following Examples, and can be implemented with appropriate modifications within the scope conforming to the purport of what is mentioned above and below herein. All of such modifications are included in the technical scope of the present disclosure.
(Gas chromatography (GC) analysis method)
Measurement Method: GC FID method
Analyzing device: GC2014 manufactured by Shimadzu Corporation
Column: DB-5MS 0.25 μm (Film)×0.25 mm (Diam)×30 m (Length) (Agilent Technologies)
Temperature of vaporization chamber: 250° C.
Temperature of detector: 280° C.
Temperature elevating conditions: 1) at 50° C. for 5 minutes, 2) elevation of temperature up to 250° C. at a temperature elevating rate of 20° C./minute, 3) elevation of temperature up to 280° C. at a temperature elevating rate of 10° C./minute, 4) at 280° C. for 10 minutes Production Example 1 (Production of Cyclic Halosilane)

The inside of a 3 L four-necked flask equipped with a thermometer, a condenser, a dropping funnel and a stirrer was replaced with nitrogen gas, and 155 g (0.591 mol) of triphenylphosphine as a coordination compound, 458 g (3.54 mol) of diisopropylethylamine as a basic compound and 1789 g of 1,2-dichloroethane as a solvent were then charged therein, to prepare a solution. Subsequently, while the solution in the flask was stirred, 481 g (3.54 mol) of trichlorosilane as a halosilane compound was slowly added dropwise from the dropping funnel in the condition of 25° C. After the completion of dropwise addition, the cyclization coupling reaction was carried out by continuously stirring the mixture for 2 hours and subsequently heating and stirring the mixture at 60° C. for 8 hours to give a homogeneous reaction solution. The resultant reaction solution was condensed and 7200 g of chloroform added thereto, a mixture was stirred at room temperature for one hour, the mixture was washed and filtered, and filtered residue was dried under reduced pressure to give a crude product of the cyclic halosilane as a white solid.

Subsequently, to the white solid obtained in the above, five times volume of dehydrated hexane on a mass basis was added, a mixture was stirred for 24 hours at room temperature to wash the mixture and the resultant mixture was filtered. The resultant filtered residue was again subjected to washing and filtration using hexane in the same manner as the above, and the resultant filtered residue was dried under reduced pressure to obtain a purified cyclic halosilane compound (bis(triphenylphosphine)dodecachlorocyclohexasilane ($[Ph_3P]_2[Si_6Cl_{12}]$)). All steps of from washing to drying were carried out in nitrogen atmosphere. When the resultant purified product was objected to gas chromatography, 1% by mass of chloroform as halogenated hydrocarbon and 1% by mass of amine salt (amine hydrochloride) were contained in the purified product.

(2) Example 1 (Production of Hydrogenated Silane Composition Containing Cyclic Hydrogenated Silane)

To a 15 L flask under nitrogen atmosphere, 100 g of the purified cyclic halosilane obtained in the above Production Example 1 and 4970 g of diethyl ether were charged and stirred at −40° C. Then, 1917 g of a 1M diethyl ether solution of $LiAlH_4$ as a reducing agent was added dropwise from the dropping funnel. After the completion of the addition, a solution was stirred at −40° C. for three hours, and the reduction reaction was carried out. Then, a reaction solution was heated to a room temperature, the solution was subjected to solid-liquid separation by decantation under nitrogen atmosphere, diethyl ether solvent was distilled off under reduced pressure, and 3250 g of dehydrated hexane was added thereto. After the addition of the hexane, diethyl ether and hexane were distilled off under reduced pressure to concentrate the solution, and the solution was subjected to solid-liquid separation by the filtration at 0° C. to remove a precipitated solid. A solvent was further distilled off from a filtrate and filtered to obtain 141 g of crude cyclohexasilane as a filtrate.

The above operations were carried out in two batches, and 273 g of crude cyclohexasilane was subjected to a distillation under reduced pressure (conditions: temperature of inner solution of 31 to 45° C., a pressure of 16 to 26 Pa) using a distillation equipment which was made of glass and was equipped with a vigreux column, a flask, a fractionating column, a condenser (a cooling pipe), and a receiver under light shielding condition to 181 g of roughly distilled cyclohexasilane (fractions 1 to 4, GC purify (Area %): 94.1% to 98.5%). Then, 101 g of roughly distilled cyclohexasilane was subjected to a distillation under reduced pressure (conditions: temperature of inner solution of 39 to 50° C., a pressure of 63 to 130 Pa) using a distillation equipment which was made of glass and was equipped with a vigreux column, a flask, a fractionating column, a condenser (a cooling pipe), and a receiver under light shielding condition to 85 g of two times-distilled cyclohexasilane (fractions 1 to 5, GC purify (Area %): 97.9% to 99.4%). Conditions for obtaining each fractions are shown in Table 1.

TABLE 1

|  | Pressure (Pa) | Temperature of inner solution (° C.) |
|---|---|---|
| Fraction 1 | 92~130 | 39 |
| Fraction 2 | 81~92 | 39 |
| Fraction 3 | 66~81 | 39~40 |
| Fraction 4 | 63~72 | 38~43 |
| Fraction 5 | 71~73 | 40~50 |

(3) Test Example 1 (Analysis of Content of Cyclic Hydrogenated Silane and Linear Hydrogenated Silane)

For two times-distilled cyclohexasilane obtained in Example 1, a content (area %) of the linear hydrogenated silane and a content (area %) of the cyclic hydrogenated silane of each sample to be analyzed were measured using a GC device.

(Preparation of Sample for Analysis)

Within a glove box under nitrogen atmosphere, 500 μl of tetradecane was charged into a GC vial. Then, 20 μl of two times-distilled cyclohexasilane was added thereto to prepare a sample for analysis.

For Lot.A (fraction 4) and Lot.B (fraction 4), measured results of the cyclic hydrogenated silane and the linear hydrogenated silane based on gas chromatography are shown in Tables 2 to 4. The numericals of Tables 2 to 4 are indicated as area %.

As shown in Table 4, a content ratio of the linear hydrogenated silane having Si atoms of 5 or less to the cyclic hydrogenated silane having Si atoms of 5 to 7 was 0.0014 in Lot.A (fraction 4) or 0.0088 in Lot.B (fraction 4), and both content ratios were 0.009 or less.

In addition, the cyclic hydrogenated silane contained cyclopentasilane, cyclohexasilane, silylcyclopentasilane, silylcyclohexasilane, and a content ratio of a total of silylcyclopentasilane and silylcyclohexasilane to the cyclic hydrogenated silane having Si atoms of 5 to 7 was 0.007 in Lot.A (fraction 4) or 0.010 in Lot.B (fraction 4), and both content ratios were 10 ppb or more.

(4) Test Example 2 (Storage Stability of Cyclic Hydrogenated Silane)

Among two times-distilled cyclohexasilane obtained in Example 1, the fraction 4 of Lot.A (GC purity (Area %) 99.4%) was charged in a stainless (SUS) container having a pressure resistance and stored at a room temperature (20° C.) within a glove box under nitrogen atmosphere. At the time when one month was passed, GC purity of cyclohexasilane was measured using a gas chromatography device, and GC purity was 99.2%.

As evident from the above results, the hydrogenated silane composition that a content ratio of the linear hydrogenated silane having Si atoms of 5 or less to the cyclic hydrogenated silane having Si atoms of 5 to 7 was 0.009 or less had excellent storage stability of the cyclic hydrogenated silane.

TABLE 2

| | Linear hydrogenated silane having Si atoms of 1 to 5 | | | | | | |
|---|---|---|---|---|---|---|---|
| Lot. | RT1.699 | RT1.881 | RT2.216 | RT2.360 | RT2.577 | RT4.566 | RT5.445 |
| A | 0.012 | 0.034 | 0.009 | 0.002 | 0.039 | 0.005 | 0.04 |
| B | 0.054 | 0.207 | 0.039 | 0.005 | 0.295 | 0.031 | 0.235 |

TABLE 3

| | Cyclic hydrogenated silane having Si atoms of 5 to 7 | | | |
|---|---|---|---|---|
| Lot. | CPS RT7.906 | SiCPS RT9.581 | CHS RT9.842 | SiCHS RT10.992 |
| A | 0.02 | 0.017 | 98.99 | 0.696 |
| B | 0.067 | 0.027 | 96.996 | 0.968 |

TABLE 4

| Lot. | Linear hydrogenated silane having Si atoms of 5 or less | Cyclic hydrogenated silane having Si atoms of 5 to 7 | Linear hydrogenated silane having Si atoms of 5 or less/ Cyclic hydrogenated silane having Si atoms of 5 to 7 |
|---|---|---|---|
| A | 0.141 | 99.72 | 0.0014 |
| B | 0.866 | 98.06 | 0.0088 |

Main Abbreviations
CPS: cyclopentasilane
CHS: cyclohexasilane
SiCPS: silylcyclopentasilane
SiCHS: silylcyclohexasilane (5) Comparative Example 1

2000 g of the crude cyclohexasilane obtained in the same condition as Example 1 was subjected to a distillation under reduced pressure (conditions: 33 to 37° C., pressure: 15 to 50 Pa) to obtain 1320 g of a distilled cyclohexasilane (fractions 1 to 6). Conditions for obtaining each fractions are shown in Table 5.

TABLE 5

| | Pressure (Pa) | Temperature of inner solution (° C.) |
|---|---|---|
| Fraction 1 | 22~50 | 33~34 |
| Fraction 2 | 15~16 | 32~34 |
| Fraction 3 | 16~22 | 31~33 |
| Fraction 4 | 14 | 33 |
| Fraction 5 | 14~15 | 33~34 |
| Fraction 6 | 15 | 34~37 |

According to measured results of gas chromatography (numericals are area %), as shown in Table 6, the fraction 6 of the obtained distilled product showed that a content ratio of the linear hydrogenated silane having Si atoms of 5 or less to the cyclic hydrogenated silane having Si atoms of 5 to 7 was 0.042 in Lot.C (fraction 6) or 0.056 in Lot.D (fraction 6), and both content ratios were more than 0.009.

Both samples of Lot.C (fraction 6) and Lot.D (fraction 6) were charged into a stainless (SUS) container having a pressure resistance and stored at a room temperature (20° C.) under nitrogen atmosphere. At the time when one month was passed, purities of cyclohexasilane were measured using a gas chromatography device, and both GC purities (Area %) were decreased by 5.4% and excellent storage stability of the cyclic hydrogenated silane could not be confirmed.

TABLE 6

| Lot. | Linear hydrogenated silane having Si atoms of 5 or less | Cyclic hydrogenated silane having Si atoms of 5 to 7 | Linear hydrogenated silane having Si atoms of 5 or less/Cyclic hydrogenated silane having Si atoms of 5 to 7 |
|---|---|---|---|
| C | 3.701 | 89.01 | 0.042 |
| D | 4.954 | 89.05 | 0.056 |

The invention claimed is:

1. A hydrogenated silane composition,
wherein a content ratio of a linear hydrogenated silane having Si atoms of 5 or less to a cyclic hydrogenated silane having Si atoms of 5 to 7 is 0.009 or less,
wherein the cyclic hydrogenated silane comprises at least cyclohexasilane, and further comprises at least one cyclic hydrogenated silane having a branched silyl group selected from silylcyclopentasilane and silylcyclohexasilane, and
wherein a content ratio of a total of the silylcyclopentasilane and the silylcyclohexasilane to the cyclic hydrogenated silane having Si atoms of 5 to 7 is 10 ppb or more on a mass basis.

2. The hydrogenated silane composition according to claim 1, wherein the cyclic hydrogenated silane comprises cyclopentasilane, cyclohexasilane, silylcyclopentasilane, and silylcyclohexasilane.

3. The hydrogenated silane composition according to claim 1, wherein the linear hydrogenated silane comprises monosilane, disilane, trisilane, tetrasilane, and pentasilane.

4. The hydrogenated silane composition according to claim 2, wherein the linear hydrogenated silane comprises monosilane, disilane, trisilane, tetrasilane, and pentasilane.

5. The hydrogenated silane composition according to claim 1, wherein a content of cyclohexasilane is 95% by mass or more per 100% by mass of the cyclic hydrogenated silane.

6. The hydrogenated silane composition according to claim 2, wherein a content of cyclohexasilane is 95% by mass or more per 100% by mass of the cyclic hydrogenated silane.

7. The hydrogenated silane composition according to claim 3, wherein a content of cyclohexasilane is 95% by mass or more per 100% by mass of the cyclic hydrogenated silane.

8. The hydrogenated silane composition according to claim 4, wherein a content of cyclohexasilane is 95% by mass or more per 100% by mass of the cyclic hydrogenated silane.

9. The hydrogenated silane composition according to claim 1, wherein a content of cyclohexasilane is 97% by mass or more per 100% by mass of the cyclic hydrogenated silane and the linear hydrogenated silane.

10. The hydrogenated silane composition according to claim 2, wherein a content of cyclohexasilane is 97% by mass or more per 100% by mass of the cyclic hydrogenated silane and the linear hydrogenated silane.

11. The hydrogenated silane composition according to claim 3, wherein a content of cyclohexasilane is 97% by mass or more per 100% by mass of the cyclic hydrogenated silane and the linear hydrogenated silane.

12. The hydrogenated silane composition according to claim 4, wherein a content of cyclohexasilane is 97% by mass or more per 100% by mass of the cyclic hydrogenated silane and the linear hydrogenated silane.

13. The hydrogenated silane composition according to claim 5, wherein a content of cyclohexasilane is 97% by mass or more per 100% by mass of the cyclic hydrogenated silane and the linear hydrogenated silane.

14. The hydrogenated silane composition according to claim 6, wherein a content of cyclohexasilane is 97% by mass or more per 100% by mass of the cyclic hydrogenated silane and the linear hydrogenated silane.

15. The hydrogenated silane composition according to claim 7, wherein a content of cyclohexasilane is 97% by mass or more per 100% by mass of the cyclic hydrogenated silane and the linear hydrogenated silane.

16. The hydrogenated silane composition according to claim 8, wherein a content of cyclohexasilane is 97% by mass or more per 100% by mass of the cyclic hydrogenated silane and the linear hydrogenated silane.

\* \* \* \* \*